March 14, 1961   G. T. RAYFIELD   2,975,078
CERAMIC COATED WIRE
Filed Oct. 21, 1957
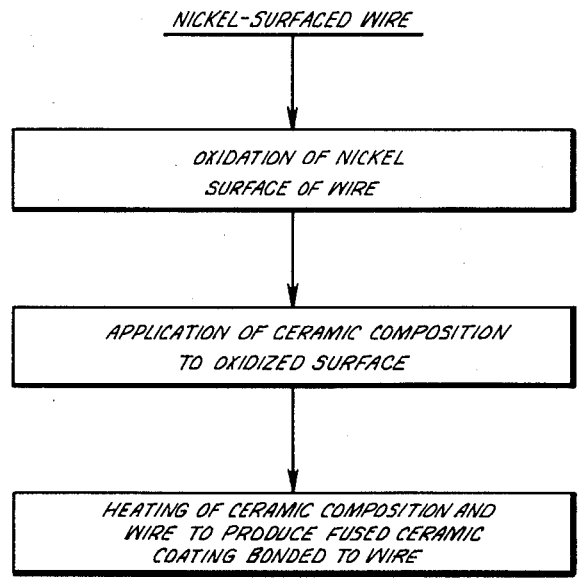
INVENTOR.
GEORGE T. RAYFIELD
BY
Christie Parker & Hale
ATTORNEYS.

United States Patent Office 2,975,078
Patented Mar. 14, 1961

2,975,078

CERAMIC COATED WIRE

George T. Rayfield, Altadena, Calif., assignor, by mesne assignments, to Consolidated Electrodynamics Corporation, Pasadena, Calif., a corporation of California Filed Oct. 21, 1957, Ser. No. 691,179

7 Claims. (Cl. 117—217)

This invention relates to a method for preparing ceramic coated wire suited for use in electrical instrumentation subjected to conditions of very high temperature. It also relates to the ceramic coated wire itself.

The utilization of electrical instrumentation under conditions of high temperature has been hampered by the lack of a bonded coating capable of protecting and insulating electrical lead wires. In the absence of a satisfactory bonded coating, wire leads are frequently placed within ceramic tubes without being bonded to such tubes. The lack of a protective bonded coating results in frequent failures of the wires since oxidation of the metal is accelerated at the elevated operating temperatures. In addition, the use of a ceramic tube results in the leads being placed in an inflexible medium.

Two distinct problems are involved in the development of a satisfactory temperature-resistant ceramic coated wire. The first problem involves the bond between the ceramic insulating material and the wire itself. This bond must be sufficiently durable so as to be unaffected by flexing and movement of the wire. Further, the bond must be unaffected by conditions of high temperature. The second problem involves the characteristics of the ceramic coating itself. This coating must be pliant so that cracking or spalling of the coating does not occur as a result of wire movement. In addition, the coating must combine characteristics of high temperature resistance and high dielectric strength.

My invention provides a method of producing a ceramic coated wire in which the coating remains bonded to the wire although subjected to flexing and coiling of the wire and temperatures as high as 2000° F. The use of the method in conjunction with an appropriate ceramic composition, such as one having characteristics of high temperature resistance, high dielectric strength and high corrosion resistance, produces a ceramic coated wire satisfactory for high temperature uses. A ceramic composition possessing these characteristics is fully described in a co-pending application, Serial No. 689,469, filed October 11, 1957.

My invention is a method of bonding a ceramic composition to an electrically-conductive wire having a substantially pure nickel surface, such as a nickel wire or other wire to which a nickel coating is added. According to the method, the wire first is heated to oxidize the surface of the nickel to an oxide of nickel. Then a ceramic powder of appropriate composition, suspended in a liquid carrier, is applied to the wire. The ceramic suspension and the wire are heated to produce a fused ceramic coating overlying the oxide of nickel surface and firmly bonded to the wire.

My invention is also a ceramic coated wire comprising an electrically-conductive wire including a coating of an oxide of nickel and an overlying ceramic sheath bonded to the wire.

An important aspect of my invention is in the discovery that provision of a nickel oxide surface on a wire produces a layer which is bonded to vitreous enamel types of ceramics in an exceptional manner. Therefore, with an electrically-conductive wire having a substantially pure elemental nickel surface, it is possible to bond a number of ceramic insulators to the wire. The wire may be pure nickel or it may consist of a core of another metal, such as copper, to which a surface layer of nickel has been applied by techniques such as extrusion or plating. The most effective bond between the insulating material and the wire is formed where the nickel layer has a very low porosity. Therefore, a technique suitable for applying a nickel layer of low porosity should be used.

Because of its high conductivity, it is often required that copper be used for certain electrical purposes. The protection of copper lead wire by the bonding of a temperature-resistant ceramic coating to the wire according to the method of the invention can be accomplished through the use of a nickel-clad copper wire. Such wire is formed by extruding a nickel layer on a copper wire core. The large number of uses to which such wire can be electrically applied make it particularly desirable to apply a protective insulating coating to such wire.

In general, a vitreous enamel type of ceramic can be bonded to a wire having a nickel surface by the method of the invention. The term "vitreous enamel type of ceramic" as well as the term "ceramic" as used in the specification and claims is used to mean those inorganic compounds, generally metallic oxides, which produce, by fusion, a glass type of coating. However, to provide the required thermal and electrical properties, the vitreous enamel should be free of the alkali metals, potassium and sodium. Further, it is to be understood that while a bond will be produced by the method of the invention between vitreous enamels and the nickel-surfaced wire, all vitreous enamels do not have suitable properties as coatings. Therefore, a ceramic composition having suitable characteristics of pliancy, temperature resistance, and high dielectric strength should be used to produce a ceramic coated wire useful under high temperature conditions.

In particular, I have used a ceramic composition which combines properties of pliancy, temperature resistance, corrosion resistance and high dielectric strength in an exceptional way. This preferred ceramic composition comprises a mixture of the oxides of lead, silicon, boron, magnesium, titanium and one or more oxides selected from the group consisting of the oxides of nickel, manganese, cobalt and iron. The ceramic composition comprises by weight from 20% to 45% lead oxide, from 20% to 45% titanium dioxide, from 5% to 20% silicon dioxide, from 5% to 25% magnesium oxide, from 1% to 4% boron oxide, and from 1% to 11% of at least one oxide selected from the group consisting of the oxides of nickel, manganese, cobalt and iron. A composition of this type is described and claimed in detail in the above referenced co-pending application.

A description of the method in terms of fusing specific ceramic compositions to nickel-clad copper wire will demonstrate the simplicity with which a coating can be bonded to the wire, particularly when such description is considered in conjunction with the accompanying drawing showing the process of the invention in a flow diagram. Further, a description of the physical properties of the coated wire will demonstrate the exceptional properties of the bonded coating.

*Example 1*

The preferred ceramic composition used, in terms of metallic oxides, had approximately the following composition by weight: 38% lead oxide, 21% titanium dioxide, 19% silicon dioxide, 12% magnesium oxide, 3% boron oxide, 3% nickel oxide, 2% manganese dioxide, 1% cobalt oxide and 1% aluminum oxide. This composition, as a fine powder, was milled with water to form a slip.

The nickel-surfaced wire, having a diameter of 0.012 inch, was oxidized by heating it in an oxidizing atmosphere (in this case, air) to a temperature between 1800° F. and 1900° F. The wire was heated by passing a 60 cycle alternating current through it for about 30 seconds. In this manner a surface layer of nickel oxide, predominantly nickelic oxide, was formed on the nickel-clad copper wire.

The ceramic slip was applied to the oxidized nickel-clad copper wire by drawing the wire through a soft artist's paint brush dipped in the slip. A 60 cycle alternating current, controlled as to amount by a variable transformer, was passed through the wire to heat both the ceramic slip and the wire to the fusion temperature of about 1700° F. A smooth vitrified coating, bonded to the wire resulted. By the same method, this ceramic composition has been successfully bonded to nickel-clad copper wires having diameters from 0.003" to 0.026".

The amount of current necessary to fuse the ceramic and to bond it to the wire is readily observed visually. This is because a smooth vitrified coating is formed when the fusion temperature is reached. The correct current can easily be established by calculation to achieve the proper fusion temperature for a particular ceramic with any wire of known or determinable resistivity.

*Example II*

To illustrate the manner in which other vitreous enamels may be bonded to the nickel-surfaced wire, a ceramic composition was prepared containing by weight about 44% lead oxide, 27% silicon dioxide, 16% barium oxide, 8% boron oxide, 3% cobalt oxide and 2% aluminum oxide. A composition of this type is described and claimed in detail in a co-pending application, Serial No. 680,432, filed August 26, 1957.

This ceramic composition was prepared as a powder and milled with water to form a slip. The method described under Example I, namely, oxidizing a nickel-surfaced wire, applying the slip to the wire, and heating the wire and slip was followed in order to fuse the ceramic composition into a coating bonded to the wire. A good bond between the ceramic and the wire was produced. However, since the ceramic coating itself did not exhibit the degree of pliancy required for a coating for a flexible wire, the use of this particular composition is not preferred as a coating for electrical leads.

It is to be understood that variations in the technique described above may be used without departing from the basic concept of the method according to the invention. For example, the ceramic slip may be milled with liquid carriers or vehicles other than water, such as fire lacquers. Similarly, the ceramic slip may be applied to the wire by other techniques, such as dipping, spraying, or flocculation. In addition, heating of the wire and ceramic can be done through the use of external heating methods, such as, for example, conventional electrical or gas flame tube furnaces. In particular, heating of the slip and wire by a radiant method, such as an electric tube furnace, is preferred to heating by passing a current through the wire itself. The radiant method of heating appears to provide a more effective bond.

The temperature required for fusing the ceramic to the wire will vary both with the particular composition of ceramic and the particular wire employed. However, the determination of the proper fusion temperature may be readily made by observation of the ceramic during the firing procedure. This is because a smooth vitrified coating results when the proper fusion temperature is attained.

The excellent thermal and electrical characteristics of a wire coated according to the method of the invention can be demonstrated by the following summary of the properties of the nickel-clad copper wire bonded to the preferred ceramic composition described under Example I.

*Wire core*—Nickel-clad copper magnet wire, 0.012" diameter.
*Thickness of ceramic coating*—0.35 mil.
*Electrical D.C. resistance* of 0.35 mil coat between wire core and aluminum sheath, °F.:

| °F. | Ohms |
|---|---|
| 400 | $1 \times 10^{10}$ |
| 600 | $6 \times 10^{8}$ |
| 800 | $4 \times 10^{7}$ |
| 1,000 | $2 \times 10^{6}$ |
| 1,100 | $5 \times 10^{5}$ |

*D.C. leakage current* (Per one foot length) (300° F. temp.), volts:

| Volts | Amp. |
|---|---|
| 50 | $2.5 \times 10^{-10}$ |
| 100 | $9.0 \times 10^{-10}$ |
| 150 | $2.5 \times 10^{-9}$ |
| 200 | $6.0 \times 10^{-9}$ |
| 250 | $2.0 \times 10^{-8}$ |
| 300 | Leaks |

*Conductance*—Same as for uncoated, bare wire up to 900° F.
*Temperature coefficient of resistance*—Same as uncoated wire $1.5 \times 10^{-3}$ ohm/ohm/° F.

The unusual character of the bond between the wire and the ceramic as well as the pliancy of the ceramic coating was demonstrated by winding the coated nickel-clad copper wire to form a 0.025 inch diameter coil without adverse effect upon the bond or rupture of the coating. In addition, the coated wire was repeatedly flexed and moved without affecting the bond or causing either cracking or spalling of the coating.

As a demonstration of the excellent thermal resistance of the wire, a 40-watt bulb was connected to a 110 volt alternating current source by means of the ceramic coated wire of the invention. The coated connecting wire leads were intertwined so as to be in close contact and placed within a furnace maintained at a temperature of 1200° F. This wire, having a diameter of 0.012 inch, was unaffected by the elevated temperature and permitted uninterrupted flow of current for the test period of approximately 8 hours.

As a further illustration of the excellent thermal characteristics of this ceramic coated wire, a wire coated according to the invention was maintained at a temperature of 2000° F. for approximately three hours. No adverse effects upon the bond between the wire and the ceramic were observed following completion of this test.

It is readily apparent that methods of coating nickel-surfaced wires in a continuous process are within the scope of this invention. Because of the flexibility of the coating, the wire may be wound on a first reel, fed to a coating and firing mechanism and then rewound on a second reel. This may be done to apply one or more coatings to the wire and either continuously or as a batch process.

Furthermore, once the initial bond between the ceramic and the wire is established, it is possible to add to the thickness of the ceramic coating by successively applying additional layers of ceramic according to the techniques already described. It has been found that excellent bonding between successive layers of ceramic is obtained and that the effectiveness of the initial ceramic-wire bond is not affected by subsequent firing to fuse additional layers. As a result, it is possible to adapt the thickness of the coating to the particular environmental conditions and the particular wire.

A nickel-containing wire, that is, a wire, such as a nickel-alloy wire, which does not have a substantially pure nickel surface also can, by the method of the invention, be bonded with a vitreous enamel. However, such a bond is generally not as satisfactory as that formed between a nickel-surfaced wire and a vitreous enamel.

The utility of the ceramic coated wire prepared according to this invention is readily apparent. Cables and connector leads coated according to the invention can now traverse areas of elevated temperatures where prior coatings failed to provide thermal and electrical insulation for the wire leads. This will mean the utilization of electrical instrumentation under conditions previously barred because of repeated failures of electrical leads. Similarly, coils, transformers and relays can be wound with wire coated according to the invention.

I claim:

1. The method of bonding a temperature-resistant pliant ceramic composition to an electrically-conductive wire having a nickel surface which method comprises heating the wire to oxidize the surface of the nickel to an oxide of nickel, applying to the wire a ceramic powder, and heating the ceramic powder and wire to produce a fused ceramic coating overlying the surface of the oxide of nickel and bonded to the wire.

2. The method of bonding a temperature-resistant pliant ceramic composition to an electrically-conductive wire having a nickel surface which method comprises heating the wire to oxidize the surface of the nickel to nickelic oxide, applying to the wire a ceramic powder suspended in a liquid carrier, and heating the ceramic suspension and wire to produce a fused ceramic coating overlying the nickelic oxide surface and bonded to the wire.

3. The method in accordance with claim 2 wherein the ceramic suspension and wire are heated to a temperature from 1600° F. to 1800° F. to produce a fused ceramic coating overlying the nickelic oxide surface and bonded to the wire.

4. The method in accordance with claim 2 wherein the ceramic suspension and wire are heated by radiant heat.

5. The method of bonding a temperature-resistant pliant ceramic composition to an electrically-conductive wire having a nickel surface which method comprises forming a metallic nickel coating around a copper wire, heating the wire to oxidize the surface nickel to nickel oxide, applying to the wire a ceramic powder suspended in a liquid carrier, and heating the ceramic suspension and wire to produce a fused ceramic coating overlying the nickel oxide surface and bonded to the wire.

6. A ceramic-coated wire comprising in combination a nickel-surfaced electrically-conductive wire including a surface coating of nickel oxide, and a ceramic composition bonded thereto, said ceramic composition comprising by weight from 20% to 45% lead oxide, 20% to 45% titanium dioxide, 5% to 20% silicon dioxide, 5% to 25% magnesium oxide, 1% to 4% boron oxide, and from 1% to 11% of at least one oxide selected from the group consisting of the oxides of nickel, manganese, cobalt and iron.

7. A ceramic-coated wire comprising in combination a nickel-surfaced electrically-conductive wire including a surface coating of nickel oxide, and a ceramic composition bonded thereto, said ceramic composition comprising by weight 38% lead oxide, 21% titanium dioxide, 19% silicon dioxide, 12% magnesium oxide, 3% boron oxide, 3% nickel oxide, 2% manganese dioxide, 1% cobalt oxide and 1% aluminum oxide.

References Cited in the file of this patent

UNITED STATES PATENTS

| | | |
|---|---|---|
| 1,779,273 | Hommel | Oct. 21, 1930 |
| 2,199,804 | Matthes | May 7, 1940 |
| 2,495,630 | Dorst | Jan. 24, 1950 |
| 2,805,173 | Ambler | Sept. 3, 1957 |